United States Patent
Ostertag et al.

(10) Patent No.: US 11,820,219 B2
(45) Date of Patent: Nov. 21, 2023

(54) BODY FLOOR FOR A BATTERY ELECTRIC VEHICLE

(71) Applicant: Dr. Ing. h.c. F. Porsche Aktiengesellschaft, Stuttgart (DE)

(72) Inventors: Jasmin Ostertag, Stuttgart (DE); Erwin Götz, Weil der Stadt (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 54 days.

(21) Appl. No.: 17/486,995

(22) Filed: Sep. 28, 2021

(65) Prior Publication Data
US 2022/0176787 A1    Jun. 9, 2022

(30) Foreign Application Priority Data
Dec. 7, 2020 (DE) ............... 10 2020 132 387.5

(51) Int. Cl.
*B60K 1/04* (2019.01)
*B62D 25/20* (2006.01)

(52) U.S. Cl.
CPC ............ *B60K 1/04* (2013.01); *B62D 25/20* (2013.01); *B60K 2001/0422* (2013.01);
(Continued)

(58) Field of Classification Search
CPC ............ B60K 1/04; B60K 2001/0422; B60K 2001/0433; B60K 2001/0438; B62D 25/20; B60Y 2306/01
See application file for complete search history.

(56) References Cited

U.S. PATENT DOCUMENTS 5,464,266 A * 11/1995 Guertler ............... B60R 19/42
                                                       293/109
9,061,712 B2   6/2015 Patberg et al.
(Continued)

FOREIGN PATENT DOCUMENTS

CN   104908566   9/2015
CN   205097915   3/2016
(Continued)

OTHER PUBLICATIONS

British Search Report dated Jun. 7, 2022.

*Primary Examiner* — Jason D Shanske
*Assistant Examiner* — James J Triggs
(74) *Attorney, Agent, or Firm* — Gerald E. Hespos; Michael J. Porco

(57) ABSTRACT

A body floor (1) for an electric vehicle (2) has a battery frame (3) that receives battery modules (4). An interior cover (5) separates an interior (6) from the battery modules (4). At least one crossmember (7, 8) extends transverse to a vehicle longitudinal direction (9) and is on the battery side of the interior cover (5). A seat attachment (10) for connecting a vehicle seat (11) is arranged on the interior side of the interior cover (5). The battery modules (4) are attached to the crossmember (7, 8) by the battery frame (3), and the body floor (1) is a supporting component of the body structure of a vehicle (2). The seat attachment (10) is attached to the body floor (1) on the battery side of the interior cover (5). With this construction, the vehicle seat is low while simultaneously arranging battery modules below the vehicle seat.

13 Claims, 1 Drawing Sheet

(52) U.S. Cl.
CPC ............... *B60K 2001/0433* (2013.01); *B60K 2001/0438* (2013.01); *B60Y 2306/01* (2013.01)

(56) References Cited

U.S. PATENT DOCUMENTS

| | | | |
|---|---|---|---|
| 10,688,854 B2* | 6/2020 | Caliskan | ............ B60K 1/04 |
| 2006/0061121 A1* | 3/2006 | Williamson | ............ B60R 7/043 |
| | | | 296/63 |
| 2017/0158039 A1 | 6/2017 | Nakamura et al. | |
| 2020/0269779 A1* | 8/2020 | Aramaki | ............ B60R 13/04 |
| 2020/0282816 A1 | 9/2020 | Matsuda et al. | |
| 2020/0406734 A1 | 12/2020 | Choi | |
| 2021/0253168 A1 | 8/2021 | Jung et al. | |
| 2022/0063388 A1 | 3/2022 | Jeon et al. | |

FOREIGN PATENT DOCUMENTS

| | | |
|---|---|---|
| CN | 209290155 | 8/2019 |
| CN | 211765900 | 10/2020 |
| CN | 112744063 | 5/2021 |
| CN | 213920734 | 8/2021 |
| CN | 214396975 | 10/2021 |
| DE | 102019113699 A1 | 11/2020 |

* cited by examiner

BODY FLOOR FOR A BATTERY ELECTRIC VEHICLE

CROSS REFERENCE TO RELATED APPLICATION

This application claims priority under 35 USC 119 to German Patent Appl. No. 10 2020 132 387.5 filed on Dec. 7, 2020, the entire disclosure of which is incorporated herein by reference.

BACKGROUND

Field of the Invention

The invention concerns a body floor for a battery electric vehicle, and a vehicle that can be driven electrically by a battery in such a body floor.

Related Art

Battery electric vehicles [BEV] are propelled by at least one electric drive machine that is supplied with electrical power from a large battery (electrical accumulator). The battery may be based on the lithium-ion concept of chemical accumulation. The battery usually has several battery modules accommodated over a large area in the body floor of the vehicle. The installation height required is typically around 200 millimeters. Accordingly, BEV vehicles typically are taller than motor vehicles driven at least partly by an internal combustion engine.

Sports cars are designed to keep the vehicle height and the seating position as low as possible. Accordingly, sports cars have been unable to accommodate the batteries in the body floor of the vehicle and typically have placed a battery concept in the center tunnel or in the engine bay region. In this context, the present invention is based on the object of at least partially overcoming the disadvantages of the prior art.

SUMMARY

The invention concerns a body floor for a battery electric vehicle, comprising: a battery frame that receives a plurality of battery modules; an interior cover for physically separating an interior from the battery modules; at least one crossmember that extends transverse to a vehicle longitudinal direction when fitted in a vehicle, and that is arranged on the battery side of the interior cover; and a seat attachment for connecting a vehicle seat arranged on the interior side of the interior cover to the body floor. The battery modules are attached to the crossmember by means of the battery frame. Additionally, the body floor is designed as a supporting component of the self-supporting body structure of a vehicle.

Thus, the body floor of at least one embodiment is characterized in that the seat attachment is attached to the body floor on the battery side of the interior cover.

In the description above and to follow, ordinal numbers are used solely for clear distinction unless explicitly indicated to the contrary, and do not reflect any order or priority of the designated components. An ordinal number greater than one does not necessarily mean that a further such component must be present.

The body floor according to one embodiment is a separate assembly that is connected to a chassis of the vehicle or forms a common pre-mounted assembly with the vehicle chassis. In a further embodiment, the battery frame and the interior cover each form separate pre-mounted assemblies that are connected together to a separate vehicle body or jointly to the vehicle chassis. The interior cover then preferably forms a (pre-mountable) assembly together with the at least one crossmember and seat attachment, and the battery frame may be configured independently thereof as a pre-mountable assembly with the desired number of battery modules, such as already positioned battery modules.

The battery frame does not necessarily form a structure providing sufficient support for the battery modules for vehicle operation. For example, in at least some embodiments, an at least supplementary reinforcing structure for the battery frame is formed by the structure connected to the interior cover (and possibly by the at least one crossmember) to secure the battery modules with sufficient stability for vehicle operation. The battery frame (for example, in a pre-mounted assembly) may comprise an underfloor protection for mechanically protecting the battery modules from impact (for example, from stones thrown up during travel). The interior cover may be a fire-proof and/or explosion-proof cover for the battery module to protect occupants in the interior. The interior cover then forms a physical or safety barrier against the battery modules. In another variant, such fire protection or explosion protection is integrated in the assembly of the battery frame or mechanically fixed to the battery frame. The at least one crossmember may be on the battery side of the interior cover, i.e. below the interior cover in the vehicle vertical direction, as is the rest of the battery frame.

The seat attachment may have a functionally conventional design for fixing the vehicle seat in a vehicle by means of the body floor. Such a vehicle seat may be a conventionally oriented vehicle seat for a vehicle occupant, viewed in the vehicle longitudinal direction. More particularly, the vehicle seat may comprise a slide mechanism and/or lever mechanism for individual ergonomic adjustment. This function optionally is provided in the vehicle seat that may be connected to the body floor, and, in this description, the vehicle seat is considered fixed, irrespective of its adjustability, when connected to the seat attachment of the body floor. The seat attachment and vehicle seat connected thereto enables a sports-car seating position that is distinguished by a flatter steering column and low seating position.

The seat attachment to the interior cover is arranged on the battery side, i.e. below the interior cover in the vehicle vertical direction (gravitational direction). The seat attachment thus overlaps with the battery modules in the vehicle vertical direction and is situated between the battery modules in the vehicle longitudinal direction. Thus, in comparison with the prior art, the seat attachment has been moved to below the interior cover to achieve a low arrangement of the vehicle seat and hence a smaller vehicle height. According to one aspect, a manufacturer can implement an open-type platform that can be used for both sports cars and taller vehicles, such as SUVs (sport utility vehicle). It is pointed out here that the seat attachment is below a plane formed by the interior cover and may constitute a separate component from the interior cover. In one embodiment, the interior cover is at least one plate-like component that is integral in the region of the seat attachment and preferably integral over the entire interior. Thus, the seat attachment may protrude down from the top or mid-plate level of the interior cover in the vehicle vertical direction, i.e. towards the battery frame.

In some embodiments, the seating position is kept low by arranging the crossmember for the vehicle seat below the vehicle floor. The interior must take into account not only floor coverings and insulation, but also the travel distance of the seat adjustment range (SVF) and/or further seating requirements (e.g. tolerance under compression when occupied), and the necessary control units with wiring. A low position of the crossmember for the vehicle seat enables both the cross-section necessary for rigidity of the component and the optimal geometry so that a optimum installation height can be achieved. The battery or battery modules may be structured so that sufficient space remains between the battery modules for the vehicle seat crossmember. In addition, the necessary distance is ensured between the vehicle seat crossmember and the battery module with a transverse supporting structure of the battery frame that is bolted to the vehicle seat crossmember. The crossmember thus fulfils at least the functions of: (A) receiving the vehicle seat (seat bolt connection); and (B) connection to the battery frame (battery frame bolt connection).

The disclosed attachment structure enables optimized bolt connection points for the heavy battery module outside the actual battery frame. The routing of the vehicle electrical system along the sill member requires no complex cable routing, thereby saving costs and assembly time. As a result, the vehicle height and seating position can be kept very low. In addition to the ergonomic, typical sports-car design possibilities, aerodynamic advantages arise because of a reduced vehicle cross-section, thereby reducing fuel consumption, increasing range and increasing top speed. This approach is suitable not only for the positions of the driver and front seat passenger, but also for further seat rows in the rear.

Irrespective of the geometry of the interior-side surface of the interior cover, the interior cover is a supporting component of the body floor, without protrusions and depressions formed solely for reinforcement and/or without increasing the overall height of the interior cover and hence the body floor in comparison with a flat design of the interior cover. Any protrusions and/or depressions are provided for the integration of function elements, such as a center console, and are neutral in installation space with respect to vehicle height. In one embodiment, such a protrusion or depression also forms a reinforcing structure for the self-supporting body structure of the vehicle. Preferably, only the at least one of the crossmembers and/or a further separate supporting structure (preferably arranged exclusively on the battery side of the interior cover, and for example extending in the vehicle longitudinal direction and/or at an angle thereto) is provided for sufficient reinforcement of an almost completely flat interior cover.

The interior cover may a plate (for example metal or plastic) that is reinforced only by the at least one crossmember and in some cases a further supporting structure attached on the battery side of the interior cover. In some embodiments, the crossmembers and any supporting structures of the interior cover are reinforced in their relative positions. The battery frame preferably is not a supporting component of the body floor, but particularly preferably is in itself not sufficiently rigid for peak loads on the vehicle, and is only adequately reinforced by the body floor after mounting. Alternatively, the battery frame also is configured for reinforcing the body floor and/or body structure of the vehicle.

The seat attachment of some embodiments is surrounded by the crossmember and may be formed integrally by the crossmember.

The crossmember in some embodiments is a separate component from the interior cover. For example, the crossmember may be connected to the interior cover on the battery side by substance bonding, for example by welding.

The seat attachment may be formed integrally by the crossmember and may form a passage opening for receiving a bolt and/or a thread (for example, configured as a separate threaded nut secured against twisting or fixed).

In a further embodiment, the body floor has a first crossmember and a second crossmember spaced apart in the vehicle longitudinal direction. The seat attachment for a vehicle seat may be formed jointly by the two crossmembers.

One or more battery modules may be arranged between the two longitudinally spaced crossmembers. With this embodiment of the seat attachment, a particularly highly stable attachment of the vehicle seat in the vehicle can be achieved with low structural requirements of the seat attachments at the two crossmembers.

The crossmember may be arranged overlapping in the vehicle vertical direction and between the battery modules received in the battery frame in the vehicle longitudinal direction.

The crossmember may protrude between the interior cover and the battery space formed on the underside of the battery frame in the vehicle vertical direction, i.e. downward in the gravitational direction and away from the interior of the vehicle. A substantial gain in installation space can be achieved by the overlap of the battery modules with the crossmember in the vehicle vertical direction, and a crossmember with a very high stiffness can be used because of the available space in the vehicle vertical direction. In one embodiment, the crossmember is shielded from the battery space in which the battery modules are accommodated. For example, the crossmember is shielded by a cover plate of the battery frame or by means of a separate component, for example a plate. Thus, in the event of fire, the crossmember is protected from the effects of flame and from excessive thermal effects.

The battery frame disclosed herein need not reduce the number of battery modules that can be accommodated in the created battery space, because the battery frame requires a supporting structure corresponding to the crossmember, and no battery module can be installed in this region even with conventional designs.

In a further embodiment of the body floor, at least one of the crossmembers extends continuously transverse to the vehicle longitudinal direction and is configured to absorb side loads in the event of a side impact. This at least one crossmember preferably extends from a left sill member to a right sill member, each of which extends in the vehicle longitudinal direction.

In this latter embodiment, the crossmember is continuous. There is no interruption, and there are no separate unconnected crossmembers in a row. The cross-section of the crossmember may be almost constant over its entire transverse extent. Thus, the crossmember forms a reinforcing structure of the body floor, preferably of the chassis. This achieves an improved stiffness so that the integral crossmember fulfils a further function. The at least one crossmember oriented transversely to the vehicle longitudinal direction improves the load path in the event of a side impact. Furthermore, buckling in the region of a tunnel, which may be present in some cases, for example integrated into the crossmember (for example for routing of the wiring loom), is suppressed efficiently and hence the elements routed through the tunnel are protected better in a side crash.

Embodiments where the seat attachment is surrounded by or formed integrally by the crossmember provide improved positional stability of the vehicle seat, against a side impact, in comparison with previously known seat attachments.

The crossmember may be fixed to the left sill member and/or the right sill member, for example by substance bonding (preferably welded). In one embodiment, the sill members are part of the body floor, and in another embodiment part of the (remaining) chassis.

The seat attachment and/or the crossmember may comprise a deformation element at the contact point to the sill members. In this embodiment, at least one deformation element is provided for the case of a crash, so that an impact acting on the seat attachment or crossmember leads to a deformation of the (upstream) deformation element. Thus, the impact energy is damped or transferred to the vehicle seat with at least a temporal delay, and hence the person seated on the vehicle seat is protected well in the case of a crash.

In some embodiments, the deformation element is formed at a contact point between the crossmember and the side members. This deformation element may be formed in the manner of a bellows and may be configured for a particularly high energy absorption (by means of deformation). This deformation element may be designed conventionally or at least functionally conventionally. The deformation element preferably may be integral with the seat attachment or crossmember.

A vehicle electrical system with at least one wiring loom can be received between the interior cover and the battery module, and at least one of the wiring looms may be placed at least in portions in a sill member. A vehicle electrical system is provided for the power electronics and also for the signal lines and signal processing. At least parts of the vehicle electrical system can be integrated into or already is received in the body floor. In one embodiment, a receiver for the at least one wiring loom of the vehicle electrical system is provided in the interior cover, preferably a component connected with the interior cover. In one embodiment, the vehicle electrical system received by the interior cover is the entire electrical system in this region of the vehicle, or part of a larger vehicle electrical system. A wiring loom comprises at least one cable (usually several cables), and the cables can be designed for widely varying tasks, such as for signal conduction and/or for power conduction.

In one embodiment, at least one of the wiring looms is received in one of the sill members of the chassis. Routing the vehicle electrical system along the sill requires no complex cable guidance and achieves savings in costs and assembly time. Furthermore, the installation height of the body floor can be reduced further. Arranging a portion of a wiring loom at a position that is susceptible to damage at least in a side impact may be acceptable because of the space saving with the body floor proposed here. Thus, a corresponding reinforcement of the sill is possible, and hence additional installation space can be gained because the (tunnel-like) cavity in the sill member, which is necessary for stiffness of the sill and is otherwise unused, is made usable. A sill member also may be connected to the crossmember and reinforced against a side impact by the crossmember. Therefore, buckling of such a tunnel for the portion of the wiring loom is prevented or at least reduced.

An intermediate space is formed between the seat shell of the vehicle seat fixed to the seat attachment and the interior cover. The interior cover may be flat in this region such that a storage compartment, for example in the form of an underseat drawer unit, can be placed below the seat shell of the vehicle seat.

Such an underseat drawer unit may be used to accommodate a first aid kit and/or warning triangle, and may be arranged between the (optional) seat rails of the vehicle seat. The seat attachment is arranged on the battery side of the interior cover in the vehicle vertical direction (i.e. below the cover in the gravitational direction). Thus, it is possible to create more free space below the vehicle seat to accommodate the underseat drawer unit or a simple storage compartment. Preferably, the interior cover is flat below the vehicle seat (i.e. on the interior side), at least in the direction of the vehicle longitudinal direction. Thus a drawer unit, and preferably an optional drawer pull unit, requiring little installation space, may be arranged on the interior cover below the vehicle seat without great difficulty.

The invention also relates to a vehicle that can be driven electrically by battery. The vehicle has a chassis with the above-described body floor in an interior and at least one vehicle seat for a passenger. The body floor is a supporting component of the self-supporting body structure of the vehicle, and at least one of the vehicle seats is fixed to the body floor by means of the battery-side seat attachment.

The vehicle comprises the body floor described above and can be driven by drive wheels using the power from the battery modules received in the body floor. The chassis forms the ground-side supporting structure of the vehicle, and may be formed as a pre-mountable component with the above-described body floor. The body floor is also a supporting component of the self-supporting body structure of the vehicle.

The chassis may define a generic vehicle platform that can be equipped with different bodies, motors and battery sizes or battery power densities. In an advantageous embodiment, plural rows of vehicle seats may be provided and at least one row is attached to the body floor as described above. Thus, a vehicle with a low overall height and ergonomic seating position can be achieved. Also, the stability of the connection of the vehicle seats in the interior of the vehicle is increased. Furthermore, the interior cover of some embodiments is a supporting component of the body floor of the vehicle.

The interior cover of the body floor is itself a supporting component of the body structure of the vehicle. Preferably, the interior cover is configured without protrusions and depressions, or at least without those that are formed solely for reinforcement and/or those that increase the overall height of the interior cover and hence the body floor in comparison with a flat interior cover. Any protrusions and/or depressions that are provided for the integration of function elements, such as a center console, are neutral in installation space with respect to vehicle height. In one embodiment, such a protrusion or depression also forms a reinforcing structure of the self-supporting body structure of the vehicle.

Sufficient reinforcement of the substantially flat interior cover may be provided by only at least one of the crossmembers and/or a further separate supporting structure (preferably arranged exclusively on the battery side of the interior cover, and for example extending in the vehicle longitudinal direction and/or angled thereto). The interior cover may be configured as a plate made, for example, of metal or plastic and reinforced only by means of the at least one crossmember and in some cases further supporting structures attached on the battery side of the interior cover. In another embodiment, the crossmember and any supporting structures present on the interior cover are reinforced in their mutually relative positions. The battery frame need not be a supporting component of the vehicle body, and may not be sufficiently rigid for the design (peak) loads on the vehicle. Rather, the battery frame is only adequately reinforced by means of the body floor after mounting in the vehicle. Alternatively, the battery frame also may be designed so that the battery frame contributes to reinforcing the body floor and/or body structure of the vehicle.

The invention described above is presented in more detail below in the technical context with reference to the appended drawings which show preferred embodiments. The invention is in no way restricted by the purely schematic drawings, and it is to be noted that the drawings are not to scale and are not suitable for defining size ratios.

DETAILED DESCRIPTION

Figure 1:
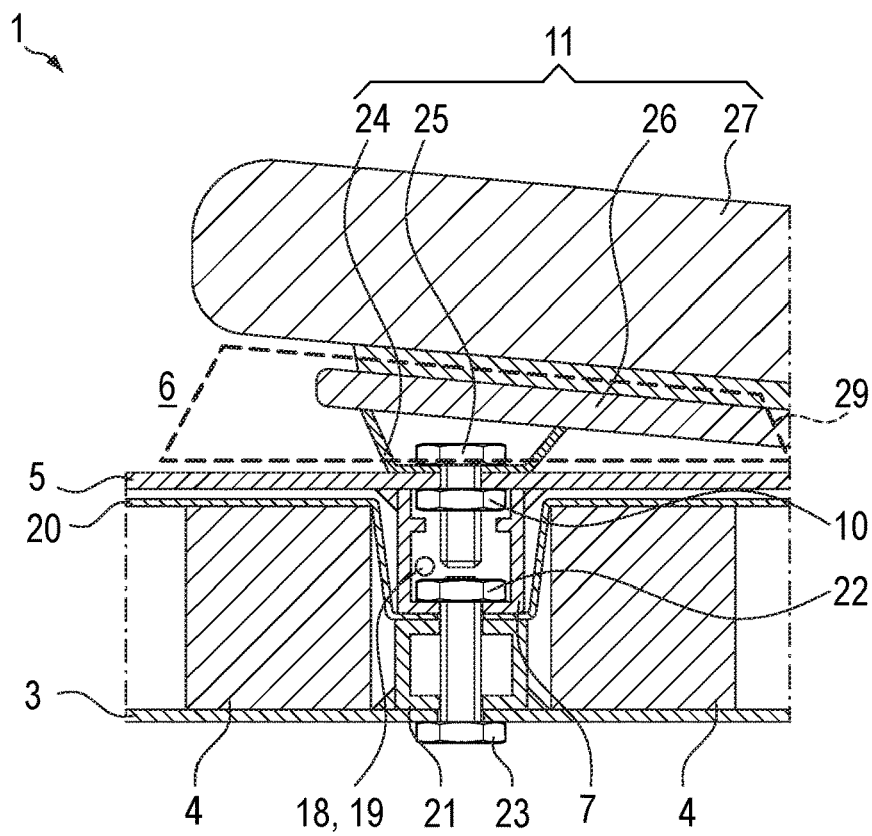
FIG. 1 in extract, a side view of a body floor for a battery electric vehicle.

FIG. 1 is a cross-sectional view of a portion of a body floor 1 for a battery electric vehicle 2 taken so that a gravitational direction runs from top to bottom on the page. The body floor 1 comprises a battery frame 3, an interior cover 5, a crossmember 7 and a seat attachment 10. Although one crossmember 7 is shown in FIG. 1, several may be provided, as shown for example in FIG. 2. The interior cover 5 physically (and preferably in safety terms) separates an interior 6, arranged at the top in the drawing, from the battery frame 3 arranged at the bottom in the drawing. The battery frame 3 is designed to receive battery modules 4. The interior cover 5 is a supporting component of the self-supporting body structure of the vehicle 2 and is configured in FIG. 1 as a plate. The interior cover 5 also is flat (at least the portion shown in FIG. 1). In this embodiment, the battery frame 3 surrounds (optionally) a protective cover 20 adjacent to the interior cover 5 above the battery modules 4. The battery frame 3 is connected by a transverse supporting structure 21 to the first crossmember 7 and preferably also to the second crossmember 8, see FIG. 2. More particularly, a frame nut 22 is mounted twist-resistantly or fixed in the crossmember 7, and a frame bolt 23 is screwed in from below. The crossmember 7 extends overlapping in the vehicle vertical direction and between the battery modules 4 in the vehicle longitudinal direction 9.

The crossmember 7 is configured for connection to the seat attachment 10 for a vehicle seat 11, so that the vehicle seat 11 is fixed in the battery electric vehicle 2 by means of the crossmember 7. The seat attachment 10 is formed by a threaded nut, mounted twist-resistantly or fixedly in the crossmember 7. The vehicle seat 11 is bolted by an underseat structure 24 to the seat attachment 10 via a seat bolt 25. The vehicle seat 11 comprises a seat rail 26 for individual adjustment of the seating position between the underseat structure 24 and the seat cushion 27 of the vehicle seat 11. In this embodiment, the interior cover 5 is flat with no reinforcing beads or other structures. Thus, a space is formed between the interior cover 5 and the underside of the seat cushion 27, for example for an underseat drawer unit 29.

The seat attachment 10 is positioned inside the first crossmember 7, which is positioned below the interior cover 5, and hence overlaps with the battery frame 3 in the vehicle vertical direction. Thus, a sports-car seating position can be achieved inside the battery electric vehicle 2, despite an arrangement of the battery modules 4 below the vehicle seat 11. In this embodiment, the crossmember 7 comprises or defines a receiver for a wiring loom 19 of a vehicle electrical system 18.

Figure 2:
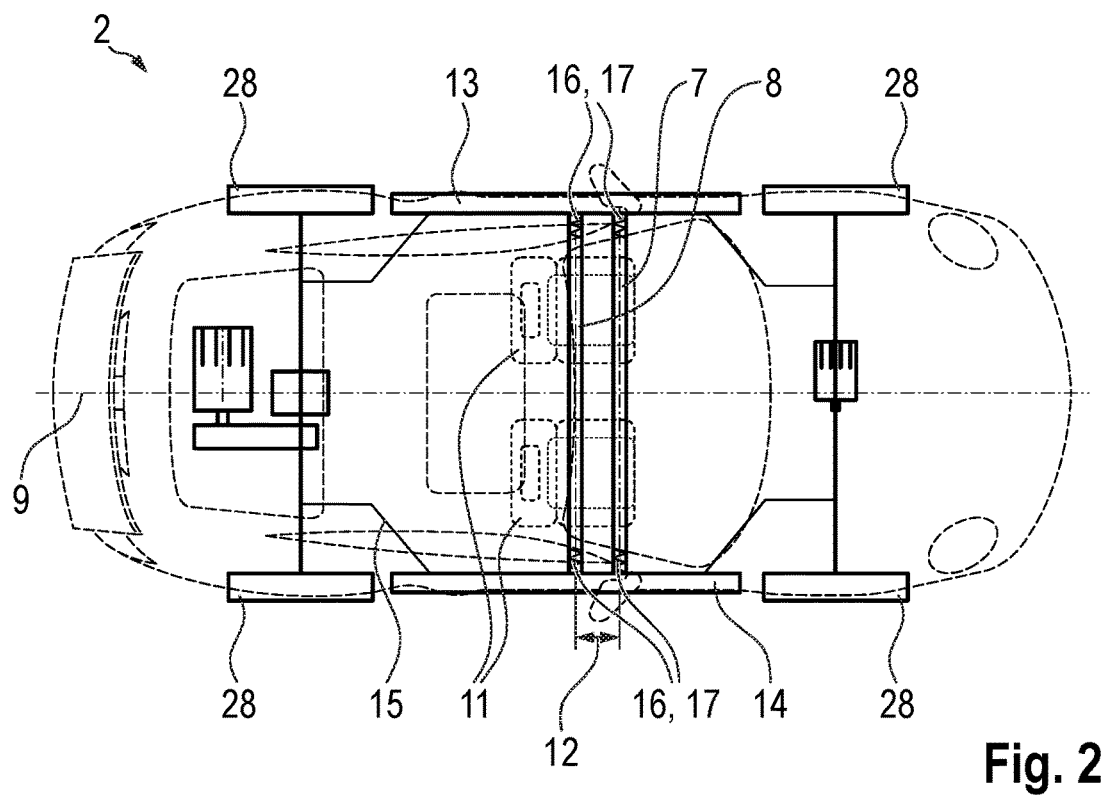
FIG. 2 a schematic top view of a battery electric vehicle.

FIG. 2 shows a schematic top view of a battery electric vehicle 2 where the vehicle longitudinal direction 9 is oriented horizontally. The battery electric vehicle 2 comprises a plurality of wheels 28, a left sill member 13, a right sill member 14, a first crossmember 7 and a second crossmember 8. The first crossmember 7 and the second crossmember 8 have a spacing 12 in the vehicle longitudinal direction 9. In this embodiment, the crossmembers 7, 8 are positioned transversely to the vehicle longitudinal direction 9 and extend between the sill members 13, 14 and adjoin the two sill members 13, 14. The sill members 13, 14 and the crossmembers 7, 8 are surrounded by a common vehicle chassis 15. The crossmembers 7, 8 are configured at their contact points 16 to the respective sill member 13, 14 (at the top or bottom respectively in the drawing) as deformation elements 17 for the case of a crash. The deformation elements 17, which are designed for example as bellows, reduce and/or delay the effect of a side impact on the seat attachment 10. In this way, the effect on the vehicle seat 11 is also reduced and/or transmitted with a delay, and hence the person seated on the vehicle seat 11 is well protected in the event of a side impact With the body floor proposed here for a battery electric vehicle, it is possible to arrange a vehicle seat low down (typical of a sports car) while simultaneously arranging battery modules below the vehicle seat.

LIST OF REFERENCE SIGNS

1 Body floor
2 Battery electric vehicle
3 Battery frame
4 Battery module
5 Interior cover
6 Interior
7 First crossmember
8 Second crossmember
9 Vehicle longitudinal direction
10 Seat attachment
11 Vehicle seat
12 Distance in vehicle longitudinal direction
13 Left sill member
14 Right sill member
15 Chassis
16 Contact point
17 Deformation element
18 Vehicle electrical system
19 Wiring loom
20 Protective cover
21 Transverse supporting structure of battery frame
22 Frame nut
23 Frame bolt
24 Underseat structure
25 Seat bolt
26 Seat bolt
27 Seat cushion
28 Wheel
29 Underseat drawer unit

What is claimed is:

1. A body floor of a battery electric vehicle, comprising:
a battery frame that receives a plurality of battery modules;
an interior cover for physically separating an interior of the battery electric vehicle from the battery modules;
at least one crossmember that extends transverse to a vehicle longitudinal direction when the at least one crossmember is fit in the battery electric vehicle, the at least one crossmember being on a side of the interior cover facing the battery modules, the battery modules being attached to the at least one crossmember by means of the battery frame;

at least one transverse supporting structure connected to the battery frame at a position between the battery frame and the at least one crossmember;

at least one frame bolt passing through the at least one transverse supporting structure and fixing the battery frame and the at least one transverse supporting structure relative to the at least one crossmember; and a seat attachment arranged on the side of the interior cover facing the battery modules and being mounted to the at least one crossmember at a position spaced from both the at least one transverse supporting member and the at least one frame bolt; and a seat bolt engaged with the seat attachment and configured for connecting a vehicle seat to the body floor.

2. The body floor of claim 1, wherein the seat attachment is surrounded by the at least one crossmember and is integral with the at least one crossmember.

3. The body floor of claim 2, wherein the at least one crossmember comprises first and second crossmembers separated from one another in the vehicle longitudinal direction to define a spacing between the first and second crossmembers in the vehicle longitudinal direction, the seat attachment for the vehicle seat being formed jointly by the first and second crossmembers.

4. The body floor of claim 1, wherein the at least one crossmember is arranged overlapping the battery modules in a vehicle vertical direction and between the battery modules received in the battery frame in the vehicle longitudinal direction.

5. The body floor of claim 1, wherein the battery electric vehicle has a left sill member and a right sill member that extend in the vehicle longitudinal direction, and the at least one crossmember extends continuously transverse to the vehicle longitudinal direction from the left sill member to the right sill member.

6. The body floor of claim 5, wherein the at least one crossmember comprises deformation elements adjacent the left and right sill members, the deformation elements being configured to absorb side loads caused by a side impact on the battery electric vehicle.

7. The body floor of claim 5, further comprising a wiring received between the interior cover and the battery module, at least part of the wiring loom looms being received in the at least one crossmember.

8. The body floor of claim 1, further comprising an underseat drawer unit arranged between the interior cover and the vehicle seat.

9. A vehicle that can be driven electrically by battery, comprising a chassis with the body floor of claim 1, the interior and the vehicle seat for a passenger, wherein the vehicle seat is fixed to the body floor by the seat attachment.

10. The body floor of claim 1, further comprising a protective cover disposed and configured to be between the interior cover and the battery modules, the protective cover further being disposed and configured to be between the at least one crossmember and the at least one transverse supporting structure.

11. A body floor of a battery electric vehicle, comprising:
a first assembly that includes:
an interior cover having opposite top and bottom surfaces,
a crossmember mounted to the battery electric vehicle and extending transverse to a vehicle longitudinal direction of the battery electric vehicle, the crossmember further being connected to the interior cover and projecting down from the bottom surface of the interior cover,
a seat attachment mounted to the crossmember at a position adjacent the interior cover, and
a frame nut fixed to the crossmember at a position spaced from the interior cover;
a second assembly that includes:
a battery frame with opposite top and bottom surfaces,
front and rear battery modules mounted on the top surface of the battery frame,
a transverse supporting structure connected to the top surface of the battery frame at a position between the front and rear battery modules, the transverse supporting structure extending transverse to the vehicle longitudinal direction when the transverse supporting structure is fit to the battery electric vehicle, and
a protective cover covering surfaces of the front and rear battery modules opposite the battery frame and covering a surface of the transverse supporting structure opposite the battery frame; and
at least one frame bolt passing through the battery frame, the transverse supporting structure and the protective cover, and wherein the at least one frame bolt is connected to the frame nut of the first assembly for fixing the second assembly to the first assembly on the battery electric vehicle.

12. The body floor of claim 11, wherein the crossmember has opposed walls extending from the interior cover, the seat attachment and the frame nut are retained between the opposed walls of the crossmember.

13. The body floor of claim 12, wherein the battery electric vehicle has a seat supported on the top surface of the interior cover, the body floor further having a seat bolt passing through an underseat structure of the seat and engaged with the seat attachment.

\* \* \* \* \*